United States Patent [19]

Morrison

[11] Patent Number: 5,547,916
[45] Date of Patent: Aug. 20, 1996

[54] THERMAL TRANSFER PRINTING RECEIVER

[75] Inventor: Gary W. Morrison, London, England

[73] Assignee: Imperial Chemical Industries PLC, England

[21] Appl. No.: 374,706

[22] PCT Filed: Jul. 29, 1993

[86] PCT No.: PCT/GB93/01606

§ 371 Date: Mar. 16, 1995

§ 102(e) Date: Mar. 16, 1995

[87] PCT Pub. No.: WO94/03333

PCT Pub. Date: Feb. 17, 1994

[30] Foreign Application Priority Data

Jul. 29, 1992 [GB] United Kingdom ............... 9216153

[51] Int. Cl.$^6$ .............................. B41M 5/35; B41M 5/38
[52] U.S. Cl. .................. 503/227; 283/94; 283/107; 428/195; 428/212; 428/480; 428/910; 428/913; 428/914
[58] Field of Search ................... 8/471; 428/195, 428/212, 913, 914, 480, 910; 503/227; 283/94, 107

[56] References Cited

FOREIGN PATENT DOCUMENTS

| 0234563 | 9/1987 | European Pat. Off. ............... 503/227 |
| 0288568 | 11/1988 | European Pat. Off. . |
| 0387718 | 9/1990 | European Pat. Off. . |
| 0440814 | 8/1991 | European Pat. Off. . |

*Primary Examiner*—Bruce H. Hess

[57] ABSTRACT

A thermal transfer printing receiver sheet for use in security laminates, comprises a substrate having a dye-receiving surface on one side and a back coat on the other, characterised in that the substrate comprises a plastics material film having on at least one side thereof a layer which has a lower melting point than the plastics material film and a strength of adhesion to the plastics material film greater than the strength of the plastics material film itself.

6 Claims, No Drawings

THERMAL TRANSFER PRINTING RECEIVER

The invention relates to receiver sheets for dye-diffusion thermal transfer printing, and in particular to receiver sheets for use in security laminates in which the receiver sheet after printing is laminated to protective cover sheets on both its printed side and its reverse side. The invention also relates to security laminates comprising such printed receiver sheets.

Security laminates are presently based on various types of information-carrying sheets laminated to cover sheets. These typically have at least one side carrying pictorial information in the form of a normal optical photograph, including typed script and/or signatures as appropriate. This is bonded to a cover sheet on each side. These cover sheets normally overlap to bond to each other and form a pouch, at least during manufacture, but in the final product the information carrying sheet may have raw unprotected edges, eg when cards or tags are stamped or cut out of a larger area.

An alternative to optical photography as a means of producing pictorial representations of persons, signatures, graphics and other such form of information, is thermal transfer printing. However, while this technology can provide some advantages, particularly in its versatility, it can also produce difficulties in lamination.

Thermal transfer printing is a generic term for processes in which one or more thermally transferable dyes are caused to transfer from a dyesheet to a receiver in response to thermal stimuli. Using a dyesheet comprising a thin substrate supporting a dyecoat containing one or more such dyes uniformly spread over an entire printing area of the dyesheet, printing can be effected by heating selected discrete areas of the dyesheet while the dyecoat is pressed against a receiver sheet, thereby causing dye to transfer to corresponding areas of that receiver. The shape of the pattern transferred is determined by the number and locating n the discrete areas which are subjected to heating. Full colour prints can be produced by printing with different coloured dyecoats sequentially in like manner, and the different coloured dyecoats are usually provided as discrete uniform print-size areas in a repeated sequence along the same dyesheet.

High resolution photograph-like prints can be produced by dye-diffusion thermal transfer printing using appropriate printing equipment, such as a programmable thermal print head or laser printer, controlled by electronic signals derived from video, computer, electronic still camera, or similar signal generating apparatus. A typical high speed thermal print head has a row of individually operable tiny heaters spaced to print six or more pixels per millimetre, using very short hot pulses.

Receiver sheets comprise a substrate supporting a receiver coat of a dye-receptive composition containing a material having an affinity for the dye molecules, and into which they can readily diffuse when an area of dyesheet pressed against it is heated during printing. Such receiver coats are typically around 2–6 μm thick, and materials with good dye-affinity are generally thermoplastic polymers, such as saturated polyesters, soluble in common solvents to enable them readily to be coated onto the substrate from solution.

Most receiver sheets also have one or more backcoats on the side of the substrate remote from the receiver layer. These are generally based on a cross-linked polymer binder, and are provided to fulfil a number of different roles, including providing increased friction to improve printer feed, providing antistatic properties and preventing transfer of dyes from one receiver sheet to another.

Clearly, weak adhesion between any of the components of a security laminate reduces the robustness and the durability of the laminate and moreover leads to the possibility of the security laminate being tampered with.

It is desirable, therefore, that the strength of the adhesion between the components of the security laminate be as great as possible and also that delamination causes the substrate itself to tear rather than that there should be any removal of any component so that any attempt to tamper with the security laminate is readily apparent.

It is common practice for the substrate to be formed of synthetic paper which has a low tear strength which makes it suitable as regards tampering but which reduces its durability. In particular, as mentioned previously, the laminate may have unprotected edges into which moisture, e.g. if the laminate is accidentally laundered, or solvent may penetrate and damage the laminate. Whilst this problem may be overcome by using a substrate formed of a plastics material, such use exacerbates the tampering problem in that the tear strength of such a substrate is normally higher than the strength of the adhesion between the substrate and the other components.

According to one aspect of the present invention, there is provided a thermal transfer printing receiver sheet for use in security laminates comprising a substrate having a dye-receiving coat on one side and a back coat on the other, characterised in that the substrate comprises a plastics material film having on at least one side thereof a layer which has a lower melting point than the plastics material film and a strength of adhesion to the plastics material sheet greater than the strength of the plastics material itself.

According to a preferred aspect of the invention the plastics material film is of biaxially drawn, crystalline polyester and the layer is of amorphous polyester co-extruded therewith. Preferably the polyester is polyethylene terephthalate.

According to a further preferred aspect of the invention, the plastics material film is of biaxially drawn, crystalline polyester and the layer is a hot melt adhesive.

The hot melt adhesive may be a low melting point polyester such as that supplied by Transilwrap Inc under the name DDOT.

Preferably, the layer has a melting point of between 100° C. and 120° C.

According to a further aspect of the invention, there is provided a security laminate comprising a) a printed thermal transfer receiver sheet comprising a substrate supporting on one side a receiver layer comprising a thermoplastic dye receptive polymer into at least part of which has been diffused a print of one or more thermal transfer dyes, and on the other side a back coat b) a cover sheet of plastics material bonded to the printed receiver layer, and c) a cover sheet of plastics material bonded to the back coat, characterised in that the substrate comprises a plastics material film having on at least one side a layer which has a lower melting point than the plastics material film and a strength of adhesion to the plastics material film that is greater than the strength of the plastics material film itself.

The invention will be more readily understood from the following examples.

EXAMPLE 1

Two webs, respectively of a) a white, biaxially drawn, polyethylene terephthalate (PET) film having on each surface a co-extruded layer of amorphous PET (Melinex D357 from ICI), and b) a white, biaxially drawn crystalline PET film (Melinex 990 from ICI)

were each provided with a receiver coat and a back coat. The receiver coat composition was Vylon 200 500 parts by weight Tegomer HSi 22100 0.65 parts by weight Cymel 303 4 parts by weight Nacure 2530 1.0 parts by weight Tinuvin 234 5 parts by weight toluene/MEK 60/40 solvent mixture Tegomer HSi 2210 is a bis-hydroxyalkyl polydimethylsiloxane sold by Goldschmidt, cross-linkable by the Cymel 303 under acid conditions to provide a release system effective during printing. Cymel 303 is a hexamethoxymethylmelamine form American Cyanamid. Nacure 2538 is an amine-blocked p-toluene sulphonic acid catalyst, and Tinuvin 900 is a UV stabiliser.

This coating composition was made by mixing three functional solutions, one containing the dye-receptive Vylon and the Tinuvin UV absorber, a second containing the Cymel cross linking agent, and the third containing both the Tegomer silicone release agent and the Nacure solution to catalyse the cross linking polymerisation between the Tegomer and Cymel materials. These were then mixed immediately prior to coating, and the quantity of solvent adjusted to give a final solution with an approximately 12% total solids content. The composition was laid down by bead coating method, dried, and cured by heating at 140° C. for 30 s.

The back coat composition was:

Pergopak M3 4.5 g

Vylon 200 150 g

Vylon 103 150 g

Atmer 190 0.75 g toluene/MEK 40/60 solvent mixture

This was applied to the reverse side of each substrate as for the receiver coat, and dried at 110° C. for 30 s.

Each receiver was printed using a Hitachi VY200 printer and part of the print was cut out using a punch. This portion was then tested for lamination capabilities.

For comparison purposes, a commercial receiver sheet (Hitachi VY-S) based on a synthetic paper substrate was printed in the same way.

The three receiver sheets were laminated at 150° C. on both sides to cover sheets consisting of PET film coated with DDOT adhesive. The lamination was carried out so that a tail of each cover sheet was left unlaminated. The resulting security laminates were then cut into 2 cm wide samples for delamination testing.

Testing was carried out on an Instron tensile tester by clamping the unlaminated tail in the upper jaws and, sticking the laminate to an aluminium plate clamped in the lower jaws using double sided tape. Delamination was effected at 2 mm/sec through 100 mm and the load was measured every 2 secs.

The results are shown in the Table.

TABLE

| SAMPLE | BOND STRENGTH (Newtons/cm) | |
|---|---|---|
| | Receiver Coat | Back Coat |
| A | 36.27 | 39.33 |
| B | 13.03 | 12.46 |
| Commercial | 1.39 | 3.13 |

Examination of the delaminated samples showed that whereas in the case of Sample A and the commercial sample, the substrate itself had torn in the case of Sample B the receiver coat and the back coat had peeled away from the substrate.

EXAMPLE 2

Example 1 was repeated except that the Melinex 990 film was coated on both sides with DDOT adhesive before the receiver and back coats were applied.

Delamination testing showed similar results to those of Sample A of Example 1.

I claim:

1. A thermal transfer printing receiver sheet for use in security laminates comprising a substrate having a dye receiving coat on one side and a back coat on the other side, characterized in that the substrate comprises a film of biaxially drawn, crystalline polyester having on at least one side thereof a layer of amorphous polyester co-extruded with the film, which layer has a lower melting point than the film and a tear strength of adhesion to the film greater than the tear strength of the film itself.

2. A receiver sheet according to claim 1 in which the film of biaxially drawn, crystalline polyester is polyethylene terephthalate.

3. A receiver sheet according to claim 1, in which the layer of amorphous polyester is polyethylene terephthalate.

4. A security laminate comprising a) a printed thermal transfer receiver sheet comprising a substrate supporting on one side a receiver layer comprising a thermoplastic dye receptive polymer into at least part of which has been diffused a print of one or more thermal transfer dyes, and on the other side a back coat b) a cover sheet of plastics material bonded to the printed receiver layer, and c) a cover sheet of plastics material bonded to the back coat, characterized in that the substrate comprises a film of biaxially drawn, crystalline polyester having on at least one side a layer of amorphous polyester co-extruded with the film, which layer has a lower melting point than the film and a tear strength of adhesion to the film greater than the tear strength of the film itself.

5. A laminate according to claim 4, in which the film of biaxially drawn, crystalline polyester is polyethylene terephthalate.

6. A laminate according to claim 4, in which the layer of amorphous polyester is polyethylene terephthalate.

* * * * *